APPARATUS TO SELECT AND IDENTIFY ONE OF A POSSIBLE PLURALITY OF TERMINALS CALLING FOR SERVICE IN A COMMUNICATION SWITCHING SYSTEM

Filed June 14, 1965 12 Sheets-Sheet 1

FIG. I

INVENTOR
ALFRED S. COCHRAN
FRANK B. SIKORSKI
BY C. A. Bullbrand
ATTY.

Nov. 26, 1968 A. S. COCHRAN ET AL 3,413,421

APPARATUS TO SELECT AND IDENTIFY ONE OF A POSSIBLE PLURALITY OF TERMINALS CALLING FOR SERVICE IN A COMMUNICATION SWITCHING SYSTEM

Filed June 14, 1965 12 Sheets-Sheet 2

Nov. 26, 1968 A. S. COCHRAN ET AL 3,413,421

APPARATUS TO SELECT AND IDENTIFY ONE OF A POSSIBLE PLURALITY OF TERMINALS CALLING FOR SERVICE IN A COMMUNICATION SWITCHING SYSTEM

Filed June 14, 1965 12 Sheets-Sheet 4

Nov. 26, 1968 A. S. COCHRAN ET AL 3,413,421

APPARATUS TO SELECT AND IDENTIFY ONE OF A POSSIBLE PLURALITY OF TERMINALS CALLING FOR SERVICE IN A COMMUNICATION SWITCHING SYSTEM

Filed June 14, 1965 12 Sheets-Sheet 5

Nov. 26, 1968 A. S. COCHRAN ET AL 3,413,421

APPARATUS TO SELECT AND IDENTIFY ONE OF A POSSIBLE PLURALITY OF TERMINALS CALLING FOR SERVICE IN A COMMUNICATION SWITCHING SYSTEM

Filed June 14, 1965 12 Sheets-Sheet 7

Nov. 26, 1968 A. S. COCHRAN ET AL 3,413,421

APPARATUS TO SELECT AND IDENTIFY ONE OF A POSSIBLE PLURALITY OF TERMINALS CALLING FOR SERVICE IN A COMMUNICATION SWITCHING SYSTEM

Filed June 14, 1965 12 Sheets-Sheet 8

Nov. 26, 1968 A. S. COCHRAN ET AL 3,413,421

APPARATUS TO SELECT AND IDENTIFY ONE OF A POSSIBLE PLURALITY OF TERMINALS CALLING FOR SERVICE IN A COMMUNICATION SWITCHING SYSTEM

Filed June 14, 1965 12 Sheets-Sheet 9

Nov. 26, 1968 A. S. COCHRAN ET AL 3,413,421

APPARATUS TO SELECT AND IDENTIFY ONE OF A POSSIBLE PLURALITY OF TERMINALS CALLING FOR SERVICE IN A COMMUNICATION SWITCHING SYSTEM

Filed June 14, 1965 12 Sheets-Sheet 12

3,413,421

APPARATUS TO SELECT AND IDENTIFY ONE OF A POSSIBLE PLURALITY OF TERMINALS CALLING FOR SERVICE IN A COMMUNICATION SWITCHING SYSTEM

Alfred S. Cochran, Elmhurst, and Frank B. Sikorski, Des Plaines, Ill., assignors to Automatic Electric Laboratories, Inc., Northlake, Ill., a corporation of Delaware Filed June 14, 1965, Ser. No. 463,587
15 Claims. (Cl. 179—18)

ABSTRACT OF THE DISCLOSURE

Each inlet terminal of the exchange has an individual identification conductor which is connected to two diodes, one diode being connected to one of a set of group identification conductors, and the other diode being connected to one of a set of trunk identification conductors. A terminal calling for service connects a source of negative potential to its identification conductor, the potential being transmitted via the diodes to the group and the trunk identification conductor. The apparatus includes group tens and units scanners, and trunk tens and units scanners, with output relays, for selecting one marked input and recording respectively the four digits of the calling terminal number. After selection and recording of the group tens and units digits of a group conductor having a negative potential, a positive blanking potential is applied via break contacts of the unoperated group scanner output relays to all group identification conductors except those in the group identified by the two digits. This prevents a negative call-for-service potential from a terminal identification conductor from appearing or any trunk identification conductor except for calls actually in the identified group. The trunk tens and units scanners are then operated in turn to select and record the trunk tens and units digits. Contacts of the scanner output relays are also used to apply operate potentials to a connect relay in a selected terminal circuit, to connect the selected terminal circuit to a plurality of common conductors used in establishing a connection in the switching network and supplying call information to and from the terminal circuit.

This invention relates to a calling line identification arrangement for a communication switching system.

The object of this invention is to provide an improved and simplified arrangement for connecting a plurality of lines to identification registers, with provisions for identifying one and only one calling line at a time.

The invention relates to line identification apparatus in which identification conductors individual to the line circuits are connected via a tree arrangement including diodes to the identification registers. In the line circuit of each calling line requesting service, a calling potential is placed on its identification conductor. The line circuits are divided into groups, and in response to a call signal the identification apparatus via one branch of the tree first selects and records the identity of the group in one set of registers, and then via another branch of the tree records the identity of the individual line within the group.

There are known calling line identification arrangements used in conjunction with automatic toll ticketing systems, in which different parts of a number are identified via different branches of a tree. The trees may comprise various types of devices, such as gas breakdown tubes, or even simple resistors. In prior art arrangements of this type, there is no problem with confusion of marking signals from different lines, beccause under control of the ticketer the marking signal is applied via a line circuit for only one call at a time. However when a line identifier is part of a marker controlled switching system in which a calling line requesting service is identified in order that the information may be used to establish a connection, the identification marking signal may appear at different line circuits simultaneously. In this situation confusion is possible. For example, with a two-digit number system, lines 43 and 52 may request service at the same time, in which case the identifier might recognize the 4 as the first digit and the 2 as the second digit, thus erroneously indicating a calling condition at line 42.

According to the invention, subsequent to the identification of the group, a blanking potential of opposite polarity from the call potential is applied via the group branch of the tree to cause a potential corresponding to a non-calling potential to be applied to the identification conductors of all lines except those in the group whose identity has been recored, so that the individual line registers will not respond to a call signal from any line except one in the group whose identity has been recorded in the group-identity set of registers. For example, each identification conductor may be connected via one diode to the group-identification branch of the tree, and another diode to the individual-identification branch of the tree, the call potential may be a negative potential applied via a resistor in the line circuit to the identification conductor, and the blanking potential may be a positive potential applied subsequent to the recording of the identity of the group to the group-identity branch of the tree and therefore via the diodes associated with that branch to the identification conductors of all groups except the one whose identity has been recorded.

In a preferred embodiment of the invention the group identity comprises two digits which are recorded in separate registers connected to the group-identity branch of the tree, and the individual identity comprises two additional digits which are recorded in registers connected to the individual-identity branch of the tree. In each branch the conductors are connected through diodes to a first-digit register, and in response to a selection of a particular first digit the conductors associated therewith are switched through to a second-digit register. The blanking potential is connected from a source through contacts actuated in response to completion of the recording of the two digits of the group identity, and through normally closed contacts associated with the outputs of the group registers to the input conductors to the group registers. The contacts associated with the specific first digit and second digit of the group selected are actuated to the open position to disconnect the blanking potential from these leads, so that for all groups except the one identified the blanking potential is applied either via the input leads at the first-digit register or the input leads at the second-digit register or both.

The apparatus further includes a connect relay in each line circuit having one side connected via a diode and a relay tree associated with the group-identification registers to one side of a potential source, and the other side of the connect relay is connected via the identification conductor and the individual-identification branch of the tree extended via diodes and contacts in accordance with the individual identification that has been recorded to the other side of the potential source, to thereby operate the connect relay in the line circuit corresponding to the identity recorded in the two sets of registers.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1 to 14 wherein:

FIG. 1 is a single line block diagram of a communication switching system in which the invention may be incorporated;

FIGS. 2–8 comprise a diagram of the portion of the system associated with the switch matrix, the terminals thereof, and its marker;

FIGS. 10 and 11 are to be arranged.

Figure 1:
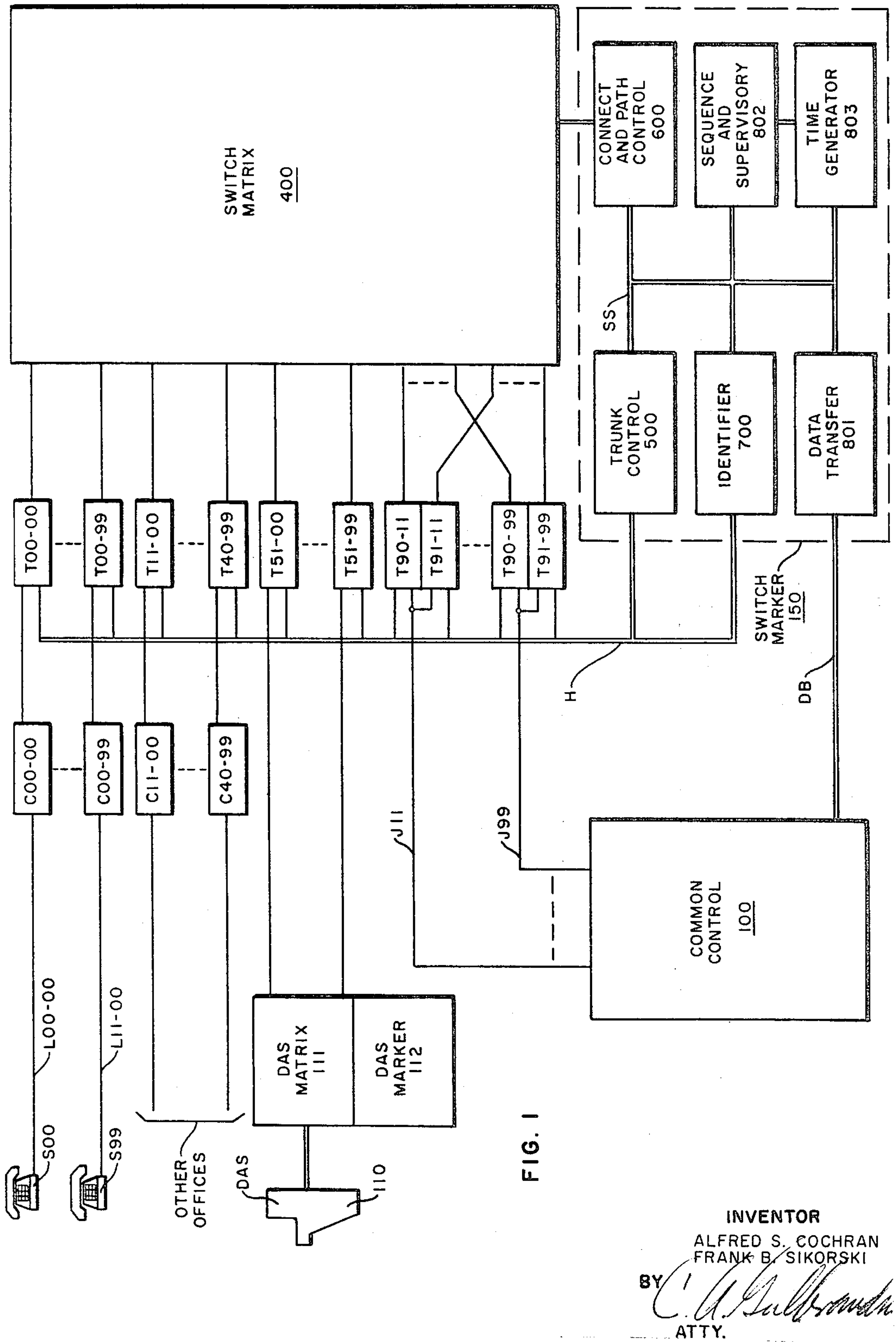

The invention may be incorporated in the Communication Switching System disclosed in the United States patent application Ser. No. 450,275 filed Apr. 23, 1965, by R. J. Murphy et al., now Patent No. 3,328,534. This system is shown in the block diagram of FIG. 1. The system is essentially a tandem exchange, but there are some subscriber stations such as S00 to S99 which are served directly. The exchange comprises a switching network or switch matrix 400, which comprises a three-stage or five-stage non-blocking network in which each terminal has an appearance on both sides of the network. The switch terminals are connected to terminal circuits T00–00 to T91–99. There are a maximum of two thousand terminal circuits are numbered in groups with a maximum of one hundred groups and a maximum of one hundred terminal circuits in each group. It will be seen that there are many more possible numbers than the maximum number of terminals, which permits considerable flexibility in assigning numbers. There is no necessary relation between the number assigned a terminal circuit and the phyisical location of its connection on the switch matrix 400. In the numbering plan all terminal circuits of the same nature are assigned the same group number. Thus FIG. 1 shows the local lines as being assigned group number 00, with the terminating circuits T00–00 to T00–99 serving the subscriber stations S00 to S99; and the interoffice trunks extending to other similar exchanges, to PBX's, and other types of exchanges as being in the groups 11 to 40. The first terminal circuit for interoffice trunks being shown as T11–00 and the last being shown as T40–99.

The exchange also includes a dial assistance switchboard 110 which may have several positions. This switchboard is provided with its own switching network or matrix 111 with a marker 112. The terminal circuits for this switchboard are shown as being in group 51, comprising circuits T51–00 to T51–99. These terminal circuits terminate both the switch matrix 400 terminals and the DAS matrix 111 terminals.

The switch matrix 400 is controlled by a switch marker 150 which comprises a trunk control unit 500, a connect and path control unit 600, a terminal circuit identifier 700, a data transfer unit 801, sequence and supervisory circuits 802 and a common time generator 803.

The common control apparatus 100 supplies the register, sender, translator, and other common control functions for the exchange. Register-sender junctors are provided to connect the switch matrix 400 to the common control apparatus 100. Each of these junctors has two terminals and corresponding terminal circuits at the switch matrix 400. The register junctors are shown as being in group 90 and the sendor junctors in group 91; the junctors being numbered in FIG. 1 from 11 to 99. That is the first register junctor comprises terminal circuits T90–11 and T91–11 and the last one shown comprises register terminal circuit T90–99 and sender terminal circuit T91–99.

All of the lines and their connections through the switching matrices are on a four wire basis. Transmission and signaling equipment with E and M signaling is provided for all lines and trunks leaving the exchange. For example the local lines are shown as served by transmission and signaling units C00–00 to C00–99 and the interoffice trunks by transmission and signaling units C11–00 to C40–99.

For terminal circuit identification on originating calls, and for trunk control, a set of conductors H from trunk control 500 and identifier 700 is connected in multiple to all of the switch matrix terminal circuits. The sequence and supervisory circuits 802 are connected via a set of conductors SS to the other units of the marker. Communication between the switch marker and common control is provided by a set of conductors DB extending from the data transfer unit 801 to the common control 100.

In operation, an originating call on one of the lines (local, incoming, or DAS) causes its terminal circuit to apply a call-for-service marking potential to one of the conductors of set H. This causes the switch marker 150 to actuate the identifier 700 to record the identity of the calling line in flip-flops in the data transfer unit 801. This identity is then transferred by way of the set of conductors DB to the common control 100. The common control apparatus 100 selects an idle register-sender and then via the set of conductors DB transfers the originating line number and the number of the register terminals of the associated junctor to the data transfer unit 801. This information via the identifier 700 and the trunk control unit 500 produces signals which via the set of conductors H actuate connect relays in the two terminal circuits, that of the originating line and that of the register terminal. Signals are then sent from the trunk control unit 500 via the set of conductors H and the connect relays in the two terminal circuits and via the switch matrix to the connect and path control unit 600. The path selection operation then occurs in unit 600 and the connection between the two terminal circuits is established through the switch matrix. Dial tone or other ready-to-receive signal tones are then sent from the common control unit via the register terminal, through the switch matrix, and the originating line terminal to the calling line. Call signals are received via this connection from the calling line into the common control apparatus 100. For an outgoing call the common control apparatus then selects an idle outgoing trunk and supplies the identity of that trunk and of the sender terminal via the set of conductors DB to the data transfer unit 801, to cause the marker to establish a connection between the sender terminal and the outgoing trunk terminal. After the completion of sending the common control equipment supplies the identity of the calling and called lines via the set of conductors DB to the marker to cause the connection to be established between these two terminals. The connections to the register terminal and the sender terminal are released. Of course, for a call terminating locally the sender connection is not required, and this step is omitted. Also with originating office control, the sender connection is not required in the tandem offices.

Figures 2, 13, 14:
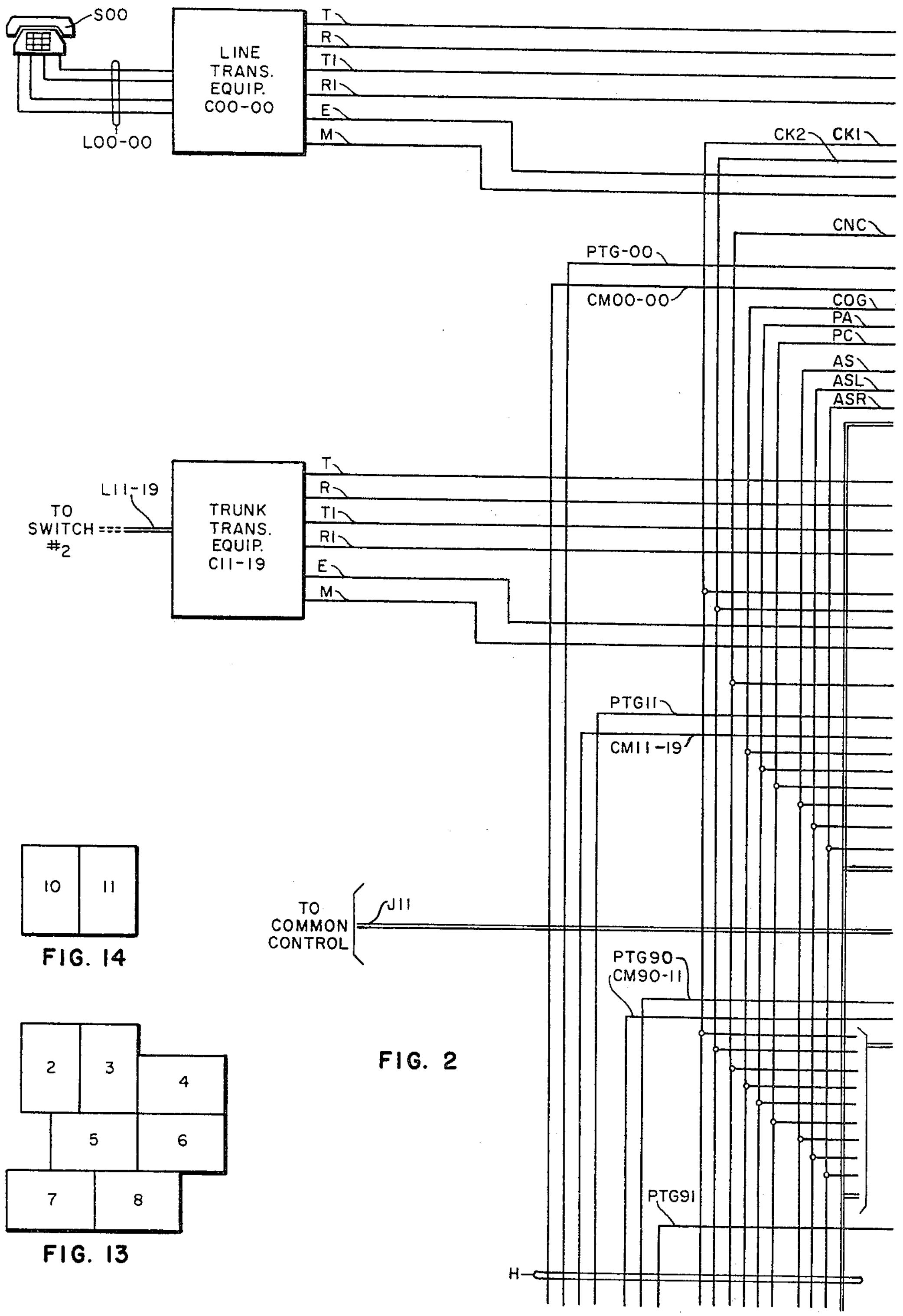
FIG. 13 shows how
FIGS. 2 to 8 are to be arranged.
FIG. 14 shows how
Figure 3:
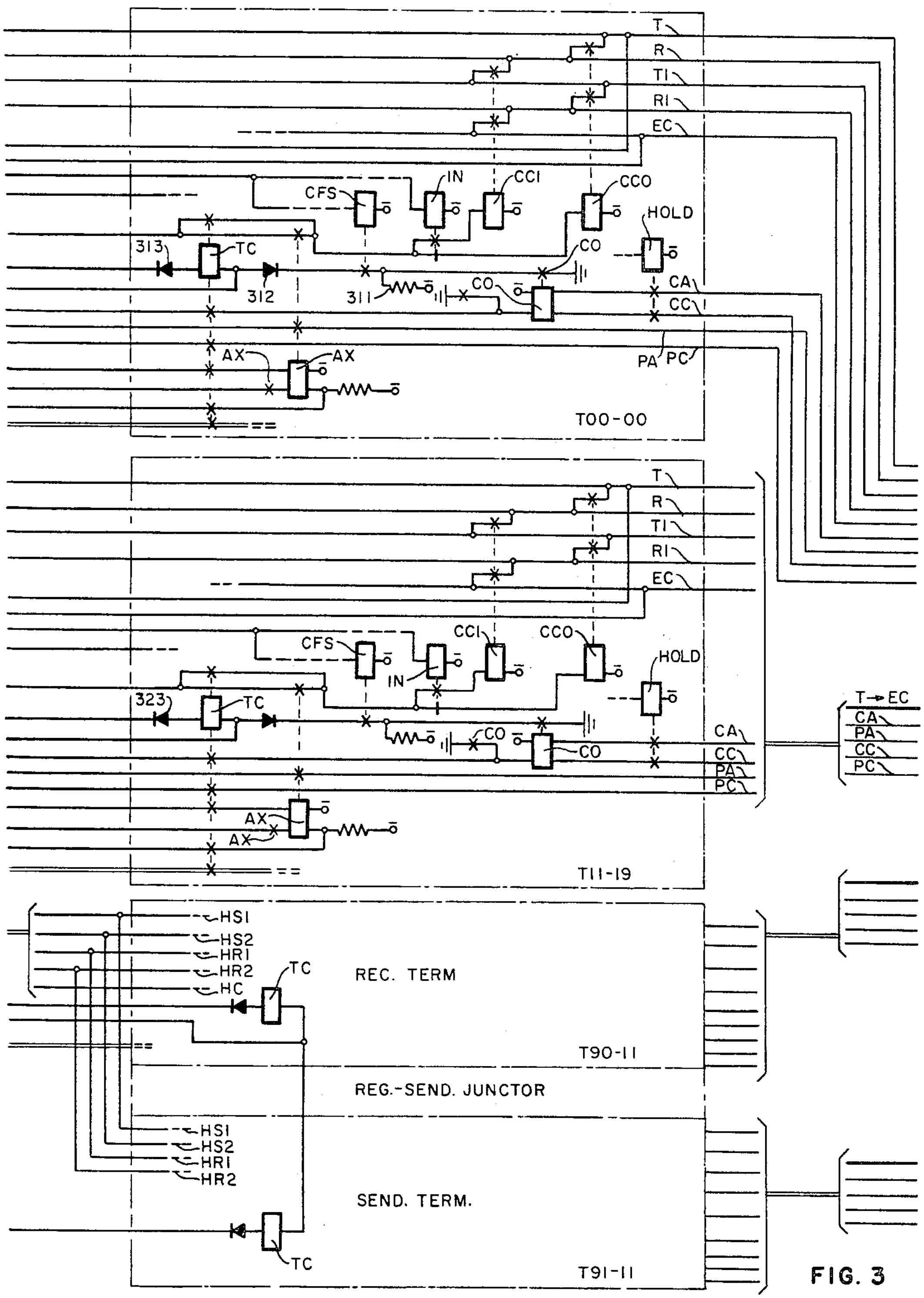
Figure 4:
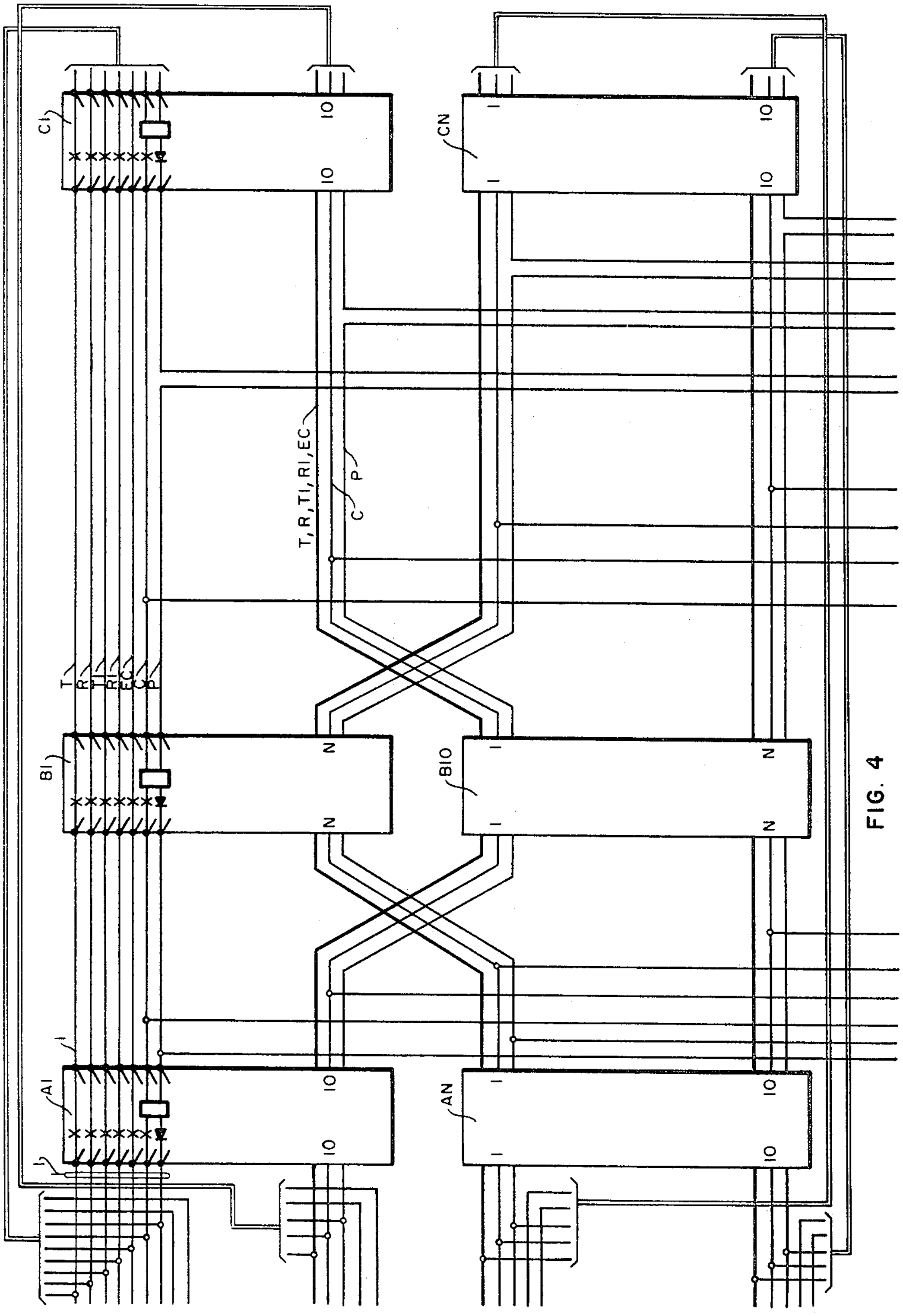
Figure 5:
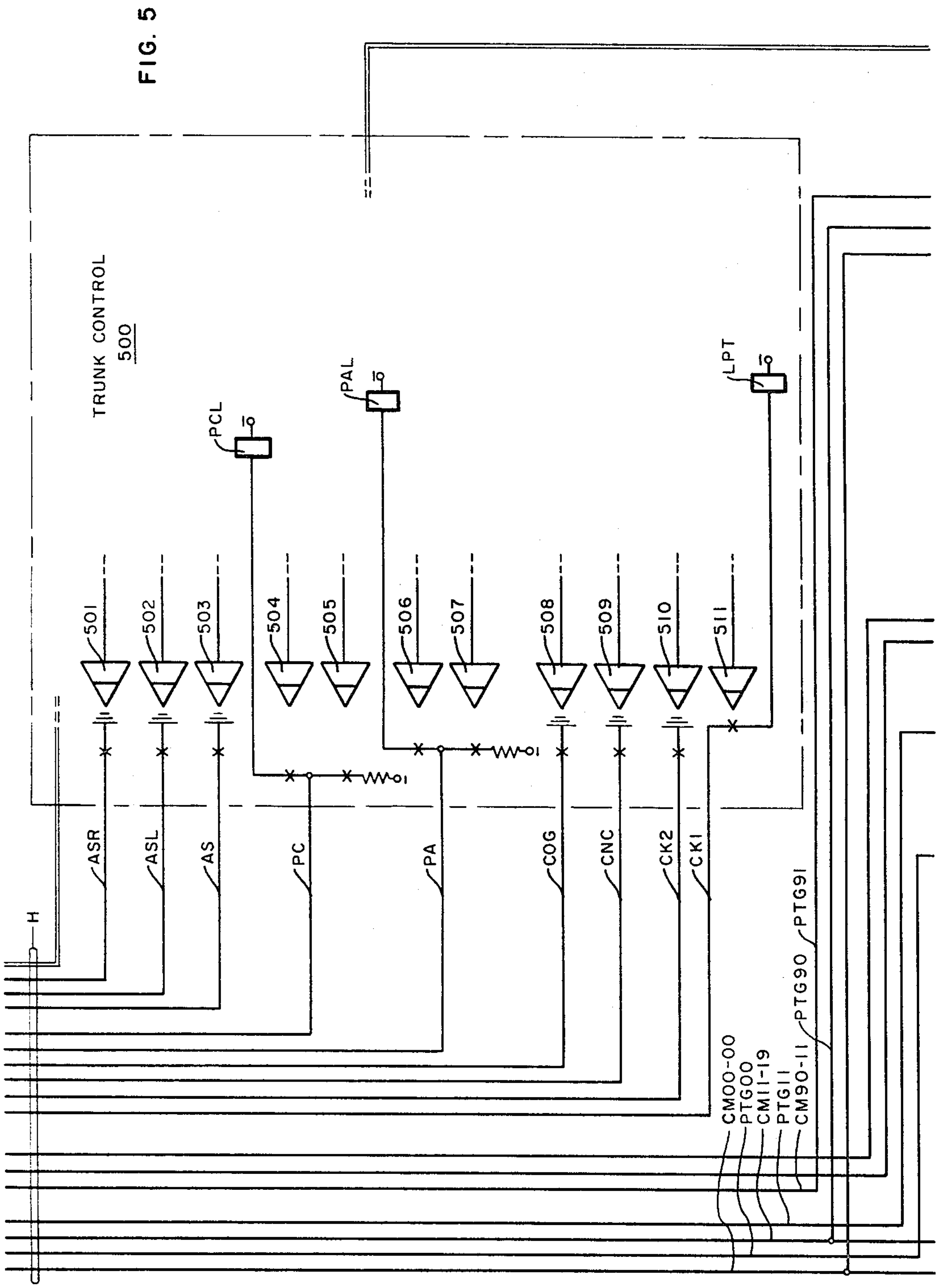
Figure 6:
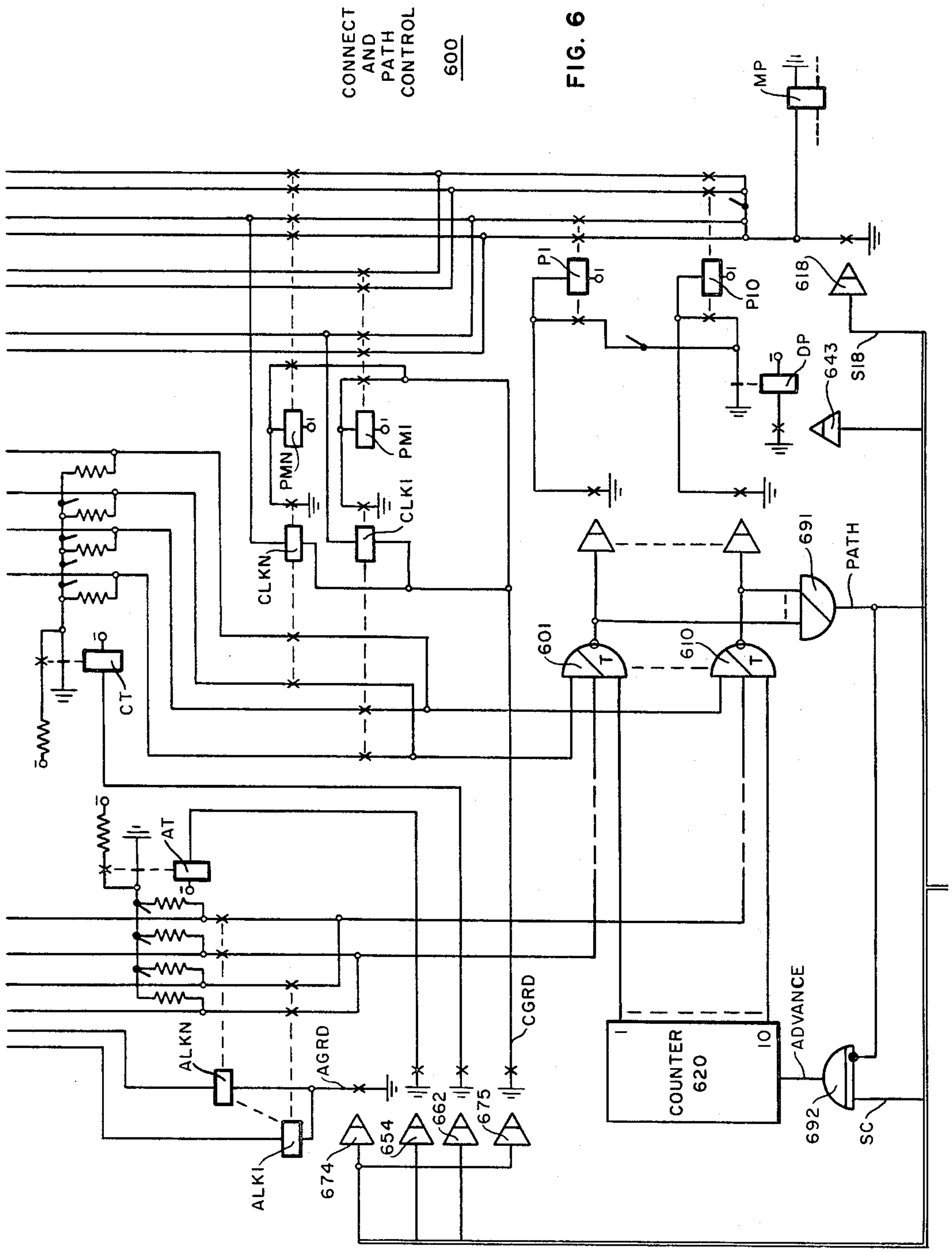

The switch matrix, its terminal circuits, and its marker are shown with some details in FIGS. 2 to 8, arranged as shown in FIG. 13. FIG. 4 shows the network arrangement for a three stage non-blocking switch matrix. Each of the stages A and C comprises $N(10\times10)$ matrix units, and the B stage comprises $10(N\times N)$ matrix units. Thus there are 100 crosspoints in each of the A and C matrix units, and $N^2$ crosspoints in each B matrix unit. Each A matrix unit and each C matrix unit has one link extending to each of the B matrix units. Each network terminal has one appearance at an A matrix unit and a corresponding appearance at a C matrix unit. One crosspoint in the first matrix unit of each stage is shown in detail. Each such crosspoint comprises a two-winding reed relay with six contacts, one winding being an operate or pull winding with a diode in series therewith, and the other winding being a hold winding with one of the contacts in series therewith. Four of the contacts are in the respective wires designated T, R, T1 and R1 of the transmission path, and one contact is in an extra control conductor designated EC. The conductor to the hold winding is designated C, and the conductor to the operate winding is designated P. The C conductors of all of the interstage links are extended into the connect and path control unit 600, idle links being open, and busy links having a hold circuit potential thereon. The P conductors of all of the BC links are split and both portions extended into the connect and path control circuit for controlling the operation of the crosspoint relays. Also the P conductor from one AB link of each A matrix unit is extended into the connect and path control 600.

Of the switch matrix terminal circuits, FIG. 3 shows one line circuit T00–00, one interoffice trunk circuit T11–19, and one register-sender junctor comprising register terminal T90–11 and sender terminal T91–11. These terminal circuits are connected between the switch matrix of FIG. 4 and the lines in FIG. 2, and also to the set of conductors H extending via FIGS. 2 and 5 to the marker. FIG. 2 shows one local station S00 connected via line L00–00 and its line transmission and signaling equipment C00–00 to the four transmission conductors and the two signaling conductors E and M to its terminal circuit. There is also shown one interoffice trunk line L11–19 connected via its trunk transmission and signaling equipment C11–19 to the six conductors to its terminal circuit T11–19. The register-sender junctor is connected via a line J11 to the common control equipment.

In the terminal circuits (FIG. 3) only some of the apparatus associated with identification of a calling line and establishment of a switch matrix connection are shown. In each terminal circuit a TC relay provides for the terminal connection to many of the conductors of the set of conductors H, including connection of the C appearance pull conductors PC. An AX relay in each terminal circuit is an auxiliary relay for connecting the A appearance pull conductor PA and for other functions. A CFS relay which is operated as a function of the incoming signaling potential on the E lead provides for connecting a negative resistance-battery potential as a call for service signal to an individual identification conductor designated CM in the set of conductors H. Each terminal circuit also includes a CO relay for cutoff, a hold relay, continuity check relays CCI and CCO, and an IN relay which is operated on incoming or originating calls as a function of the potential on the E lead. In addition to the conductors individually shown in the set or conductors H, there are additional conductors connected between the trunk control circuits 500 and all of the terminal circuits which are connected via contacts of the TC relay. Each terminal circuit in addition to the apparatus shown also includes several relays and other apparatus for transmission and control functions.

The trunk control unit 500 (FIG. 5) of the marker provides for supplying signals to and from the terminal circuits via the set of conductors H. Some of these signal conductors are specifically shown with the signals controlled via relay drivers 501 to 511. There are additional such circuits not shown, and also circuits, not shown, for receiving signals from the terminal circuits.

The connect and path control unit 600 (FIG. 6) includes provisions for scanning the links to select the path, and to apply the potential for holding the selected connection. The relays ALK1 to ALKN are each connected to one of the pull conductors of the corresponding matrix units. A negative potential applied to the pull conductor PA at the terminal side of any A matrix unit will be supplied via the diode and pull winding paths to all of the P conductors on the link side of the matrix unit. Therefore any one of the P leads of the A links for each A matrix unit may be used to operate the corresponding relay in the connect and path control unit 600. Similarly the relays CLK1 to CLKN are connected via P leads to the corresponding ones of the C matrix units. These relays connect the C condutcors of the links to the scanning gates 601 to 610 which are controlled by the counter 620. The relays ALK1 to ALKN and CLK1 to CLKN have high resistance windings so that they may operate in series with crosspoint relay windings without drawing sufficient current to operate the crosspoints. The relays PM1 to PMN are operated via contacts of the corresponding ones of the relays CLK1 to CLKN. These relays provide for connection of the operate ground to the pull conductors of the BC links.

Figure 7:
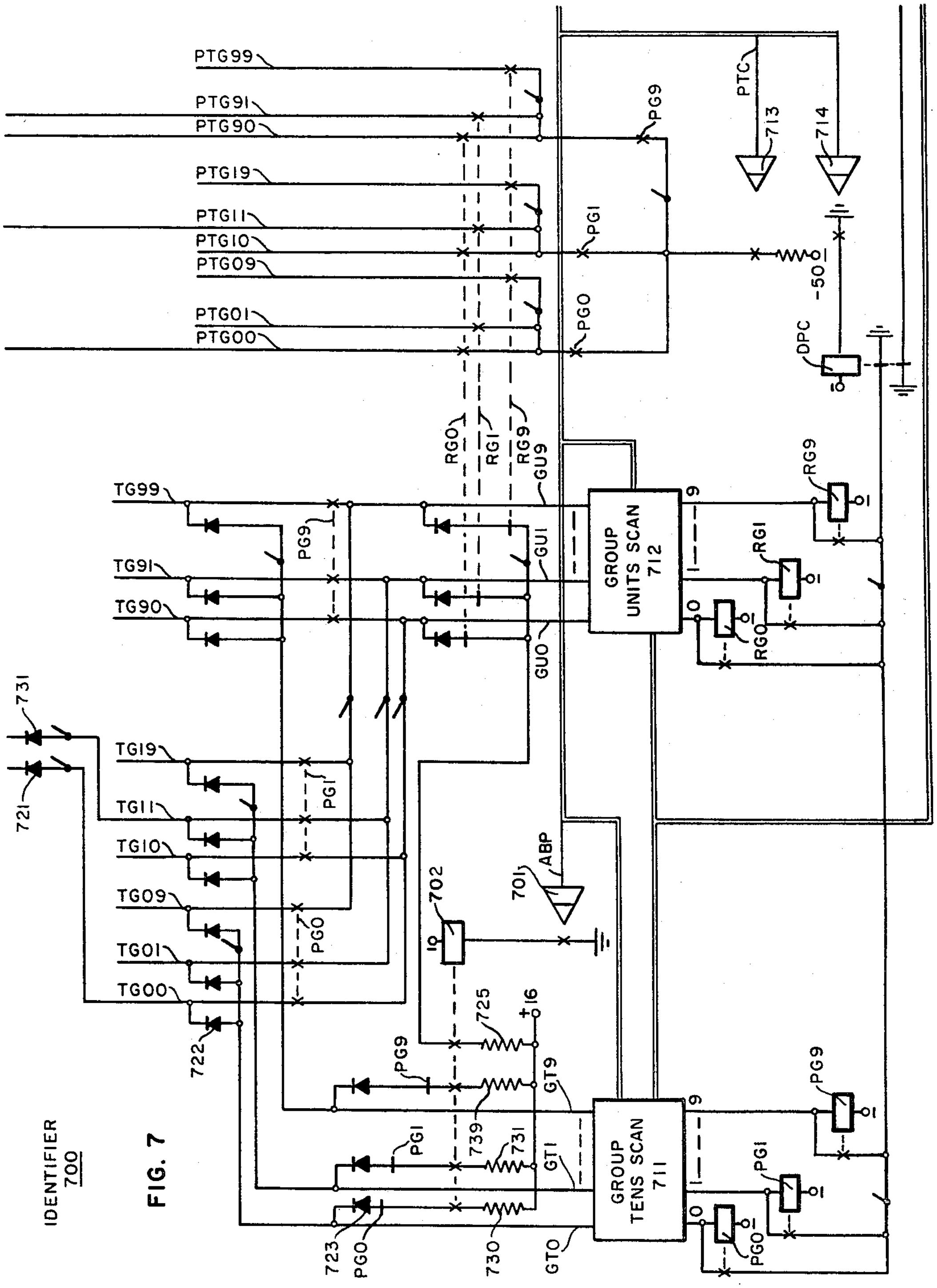
Figure 8:
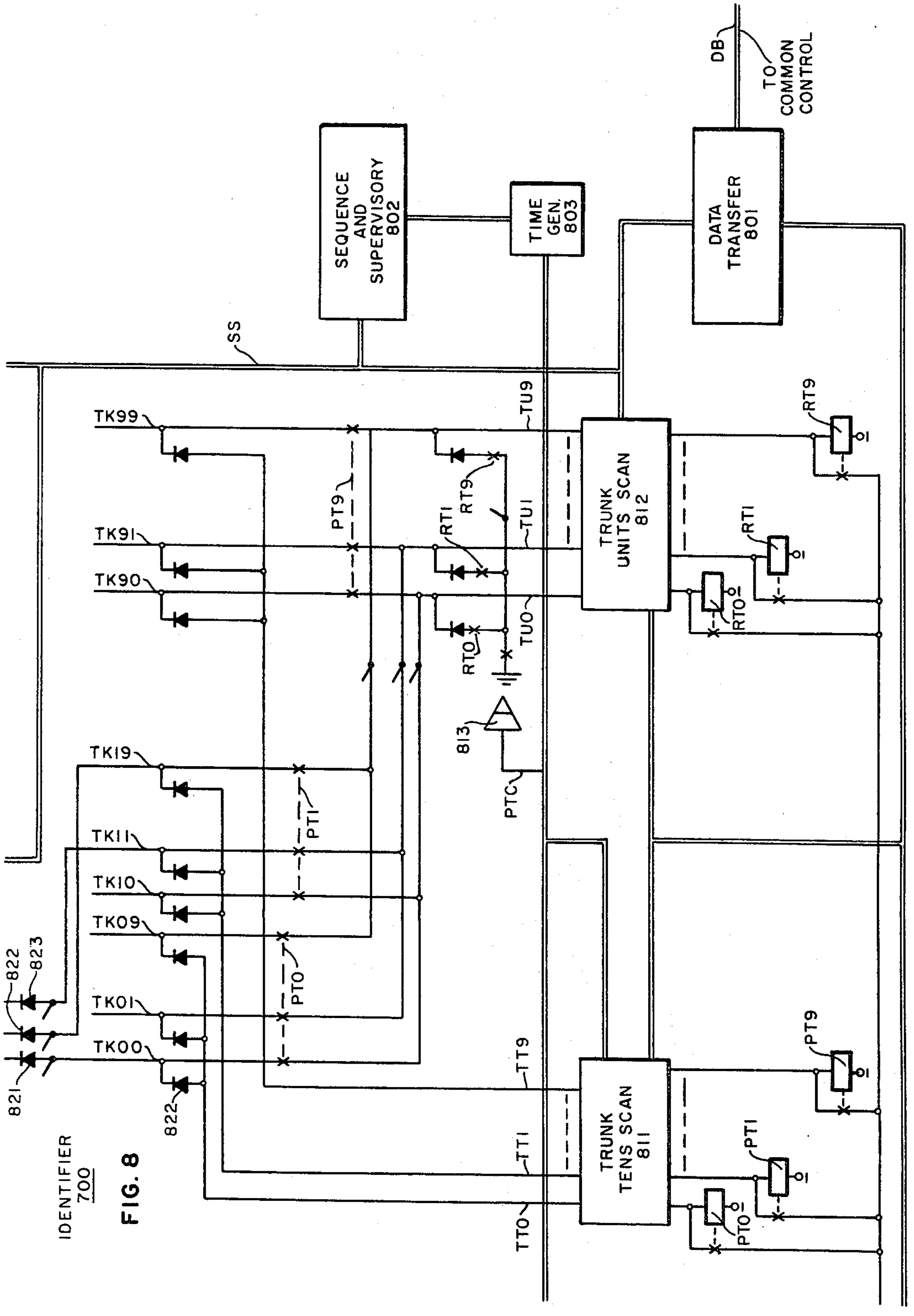

The identifier 700 is shown in FIGS. 7 and 8. It comprises a group tens scanner 711, a group units scanner 712 a trunk tens scanner 811 and a trunk units scanner 812. The identifier includes a group register having group number recording relays comprising ten relays PG0 to PG9 and ten relays RG0 to RG9 connected respectively to outputs of the scanners 711 and 712 to record the group tens and units digits, and a trunk register having trunk number recording relays comprising ten relays PT0 to PT9 and ten relays RT0 to RT9 connected respectively to outputs of the scanners 811 and 812 to record the trunk tens and units digits. The data transfer unit 801 includes originating-digit flip-flops and counting logic circuits, with the flip-flop output leads connected to supply signals for the scanners, to select one identfication conductor marked with a call-for-service signal by selecting one marked input conductor of each of the four scanners in turn. The number of the selected terminal circuit is thereby recorded by the flip-flops of unit 801, and also by the number recording relays. Thus the complete group number recording means and trunk number recording means includes both the originating digit flip-flops of unit 801 and the relays connected to the scanner output leads. There are up to one hundred group identification leads TG00 to TG99, which are connected via individual diodes and then multipled in groups of ten to the corresponding inputs GT0 to GT9 of the group tens scanner 711, and are also connected via contacts of the group tens scanner output relays PG0 to PG9 and connected in multiple to corresponding ones of the input leads GU0 to GU9 of the group units scanner 712. Contacts of the group tens scanner output relays PG0 to PG9 and the group units scanner output relays RG0 to RG9 also form a relay tree from negative battery potential to the one hundred leads PTG00 to PTG99, which are conductors of the set H, and each is connected in multiple to the TC relays of all of the terminal circuits of the corresponding group, via an individual diode in each terminal circuit.

There are also up to one hundred trunk identification leads TK00 to TG99 which are connected via individual diodes and then multipled in groups of ten to the input leads TT0 to TT9 of the trunk tens scanner 811, and also via contacts of the trunk tens scanner output relays PT0 to PT9 and multipled in groups of ten to the input conductors TU0 to TU9 of the trunk units scanner 812. Contacts of the relays RT0 to RT9 complete a relay tree from the conductors TK00 to TK99 to a ground potential via relay driver 813.

The individual identification conductor of each terminal circuit has two diodes associated with it, one for connection to one of the group identification leads and one for connection to one of the trunk identification leads. For example from terminal circuit T00–00 the identification conductor CM00–00 is connected via diode 721 to the group identification conductor TG00, and also via diode 821 to the trunk identification conductor TK00.

According to the invention, a blanking potential is provided which extends from the positive 16-volt voltage source via resistors 725 and 730 to 739 and contacts of a relay operated by relay driver 701 and via break contacts of the group scanner output relays and individual diodes to the input conductors of the group scanner, the blanking potential being extended to the group identification conductors and then to the individual terminal circuit identification conductors. Note that this blanking potential is applied to all of the individual identification conductors except those in the identified group.

Figure 10:
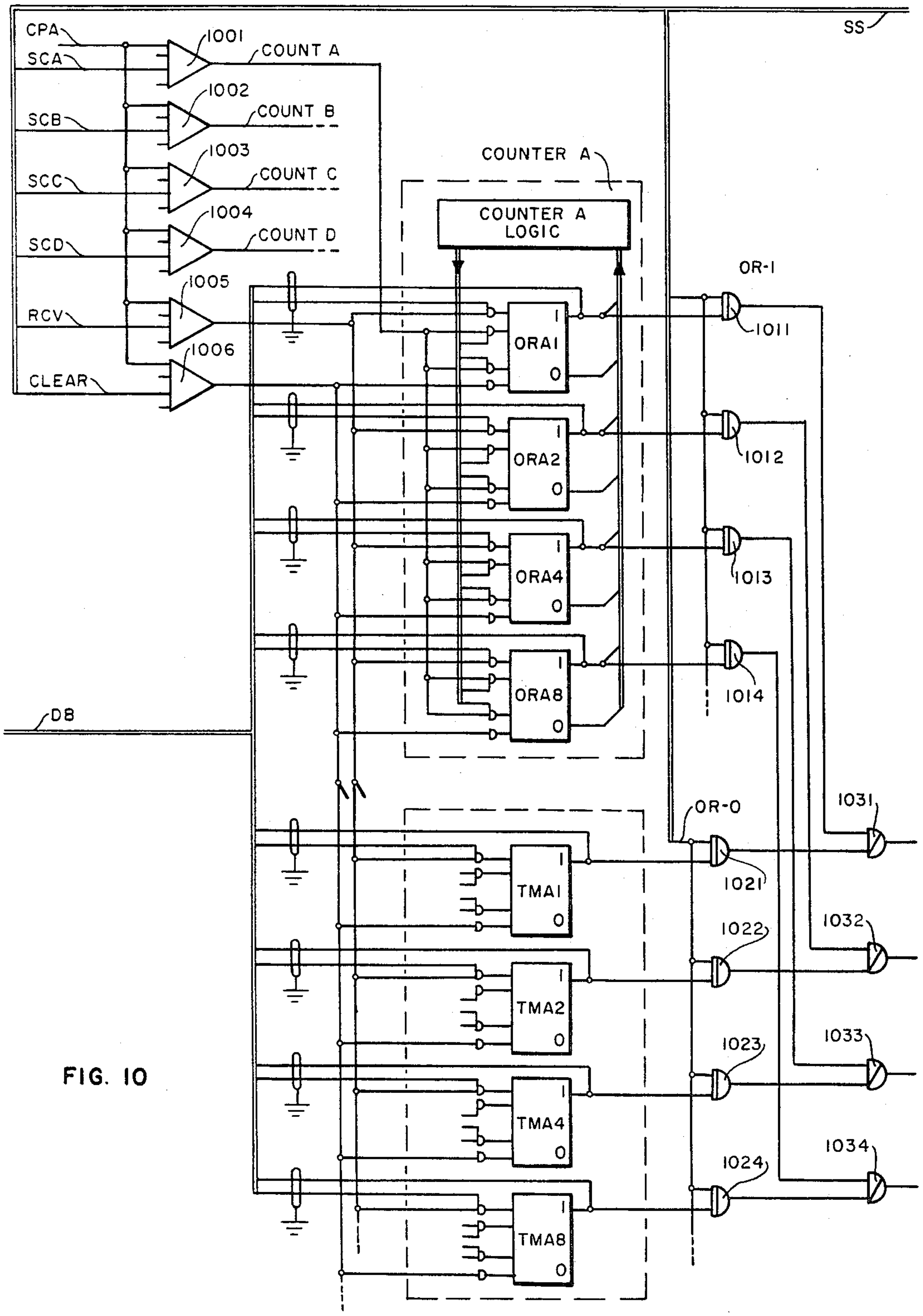
FIG. 10 is a functional block diagram of part of the data transfer unit of the marker.
Figure 11:
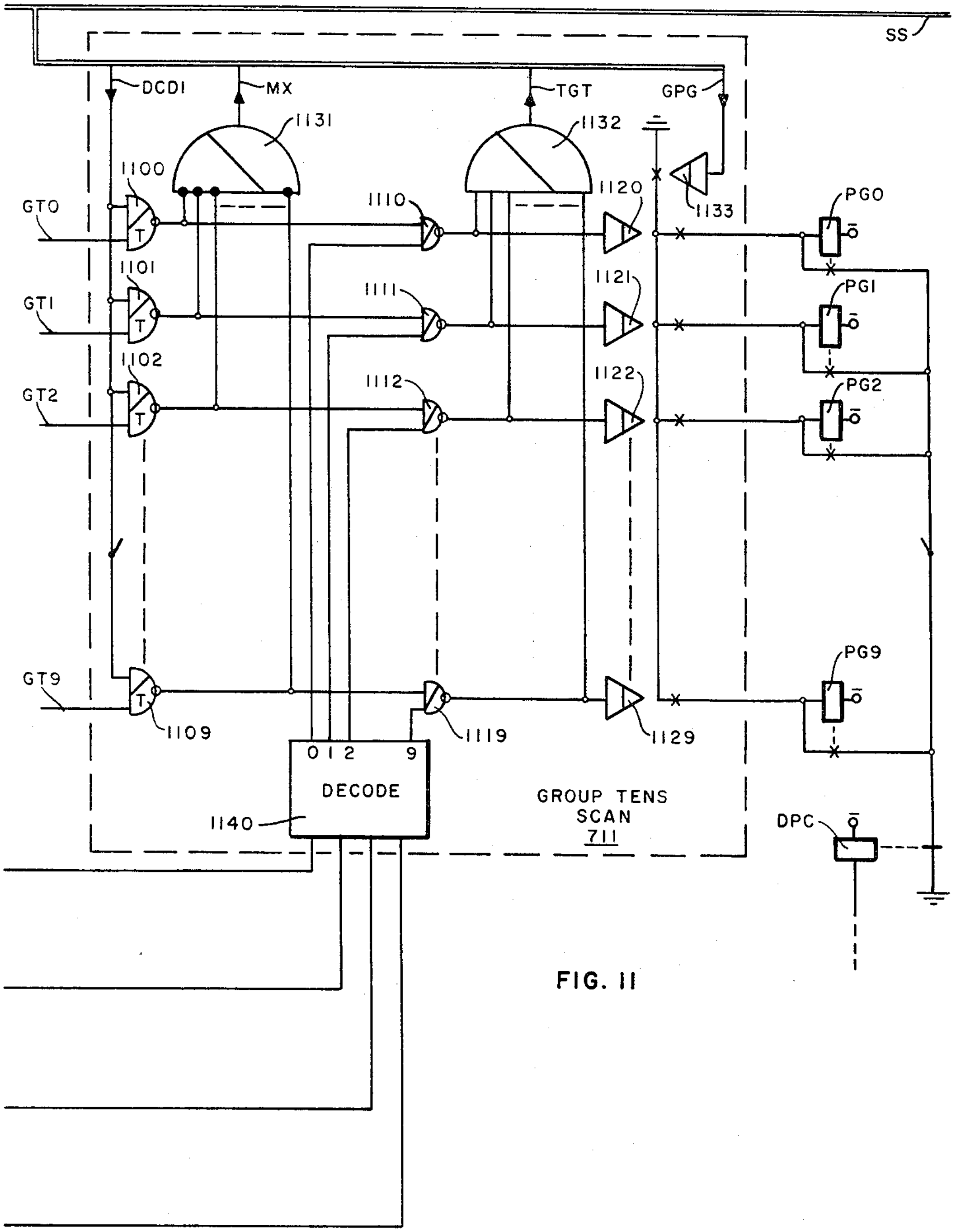
FIG. 11 is a functional block diagram of the group tens scan part of the identifier.
Figure 12:
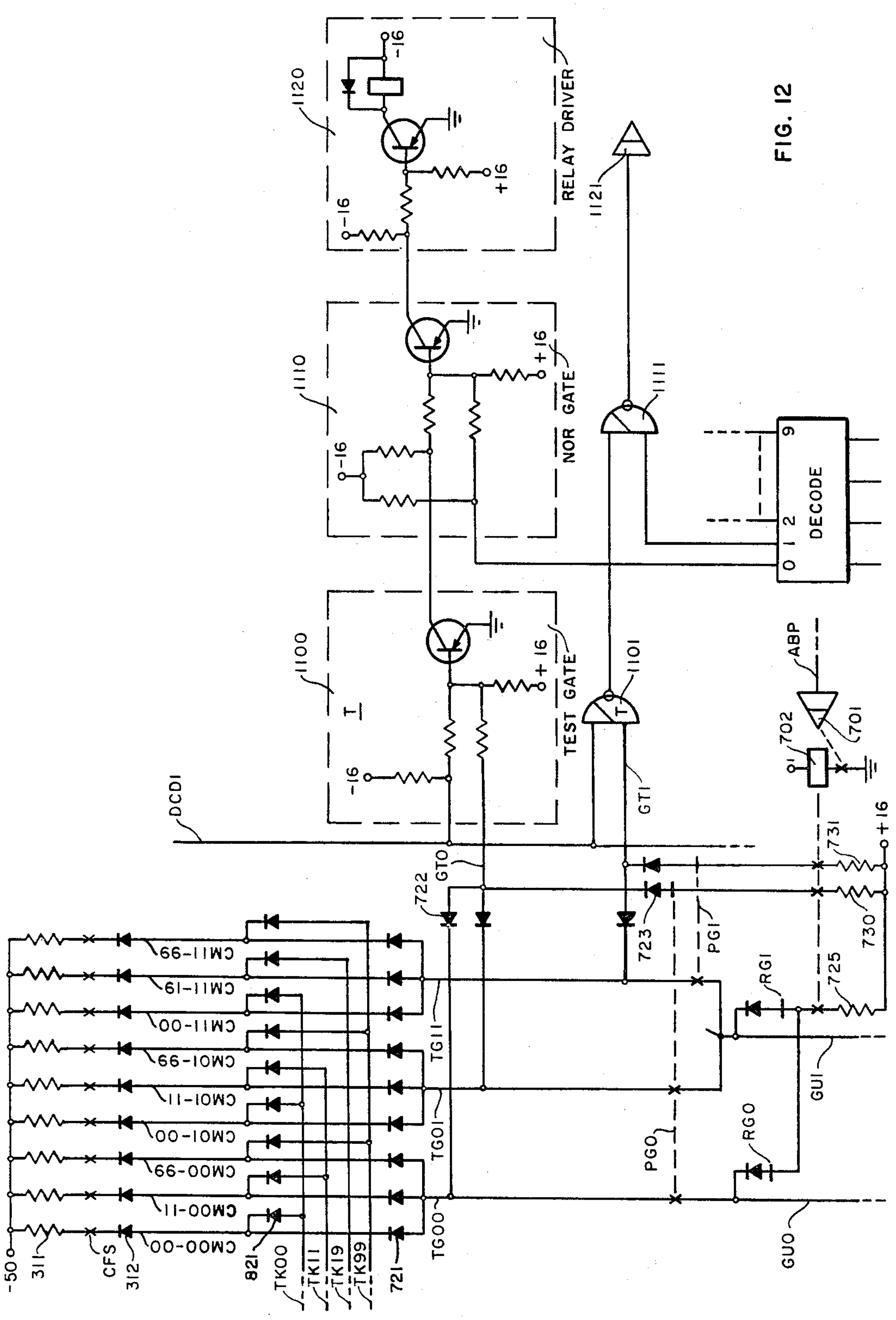
FIG. 12 is a schematic diagram illustrating the principle of the identification arrangement.

The group tens scanner 711 is shown by a functional block diagram in FIG. 11, and the portion of the data transfer unit 801 associated therewith is shown in FIG. 10. The ten input leads GT0 to GT9 of the scan circuit are connected respectively to test gates 1100 to 1109, and the outputs of these test gates are connected respectively via NOR gates 1110 to 1119 to the respective relay drivers 1120 to 1129. The contacts of the relay drivers are connected respectively to the output relays PG0 to PG9. In FIG. 12 the test gate 1100, the NOR gate 1110, and the relay driver 1120 are shown schematically. Each of these circuits comprises a PNP transistor having its emitter electrode grounded, and the output taken from its collector electrode. In the relay driver 1120 the collector electrode is connected via a winding and a shunt diode to a negative 16-volt potential source, the output contact being controlled by the winding. In each circuit the base electrode is biased by a 30,000-ohm resistor to a positive 16-volt source. Each input of each circuit is connected via an individual 6200-ohm resistor to the base electrode of the transistor. Each of these inputs except the test input of the test gate is connected via an individual 5100-ohm resistor to the negative 16-volt source, thereby supplying the collector bias potential for the preceding circuit. For the logic in this system negative potential is the true condition, and ground potential is the false condition. Note that with the transistor provided in each gate circuit there is an inherent inversion of the signal condition. Thus with the NOR gate 1110, if each of the input leads is false (ground potential) the transistor is biased to cutoff, so that the negative potential at the succeeding circuit is effective to provide a true input signal. If any one of the input signal leads has a true condition thereon (the transistor of the preceding circuit biased to cutoff) the negative potential is effective to bias the transistor to saturation to provide a ground potential (false condition) at its collector electrode. For the test input of the test gate 1100 the negative potential for the true condition is supplied via the circuit being tested. Therefore for this input an open circuit (or also a ground potential) is the false condition. Thus for the test gates and the NOR gates, if all of the inputs are false the output is true, and if any one of the inputs is true the output is false.

The data transfer unit 801 includes flip-flops associated with each of the scanners of the identifier, there being four flip-flops for an originating number and four flip-flops for a terminating number for each digit. Thus as shown in FIG. 10, the flip-flops associated with the group tens scanner 711 include originating number flip-flops ORA1, ORA2, ORA4 and ORA8, and terminating number flip-flops TMA1, TMA2, TMA4 and TMA8. The corresponding flip-flops not shown for the group units scanner 712 are ORB1 to ORB8 and TMB1 to TMB8, those for the trunk tens scanner 811 are ORC1 to ORC8 and TMC1 to TMC8, and those for the trunk units scanner 812 are ORD1 to ORD8 and TMD1 to TMD8. Each of these flip-flops includes two pulse gates shown at the left side at the top for setting the flip-flops and two similar pulse gates shown at the bottom for resetting the flip-flop. In each of these pulse gates the input shown on the left side is an AC input, and the input shown off the side of the gate is a DC input. The DC input must be true for the AC pulse to be passed to actuate the flip-flop. For each flip-flop the first DC set input is connected to one of the set of conductors DB. A signal RCV from the sequence circuits enables a gated pulse amplifier 1005 to supply a clock pulse to the AC inputs of the first coincidence gate of each flip-flop to cause the signals to be received by the conductors DB from the common control and stored in the flip-flops. One output conductor from each flip-flop is also connected to one of the conductors of the set DB. In the set of conductors DB the input and the output conductor for each flip-flop form a shielded pair.

For scan control in the identifier the originating digit flip-flops are also arranged as counters. Thus for controlling the group tens scanner 711 the flip-flops ORA1 to ORA8 form a counter with counter logic circuits coupled between the flip-flop outputs and the DC inputs of the second and third pulse gates of these flip-flops, for set and reset respectively. The sequence circuits actuate the scanner by supplying a signal SCA which enables the gated pulse amplifier 1001 to supply a clock pulse to the AC inputs of the second and third pulse gates of the four flip-flops. Likewise for the other three scanners of the identifier 700 the originating digit flip-flops are also arranged as counters designated counter B, counter C and counter D respectively, and controlled with signals SBC, SCC and SCD via gated pulse amplifiers 1002, 1003 and 1004 respectively.

To clear the data transfer unit 801, a signal CLEAR from the sequence circuit enables gated pulse amplifier 1006 to supply a clock pulse to the lower reset pulse gate of all of the flip-flops to reset them.

Gates are provided to couple the outputs of the flip-flops to the identifier 700. For example the outputs of flip-flops ORA1 to ORA8 are connected to AND gates 1011 to 1014 which may be enabled by a signal OR–1 from the sequence circuits. The outputs of the gate TMA1 to TMA8 are connected respectively to gates 1021 to 1024 which may be enabled by the signal OR–0 of the sequence circuits. These signals are channelled via OR gates 1031 to 1034 to the decode unit 1140 of the scanner. Each of the scanners has a corresponding decode unit. The signals are decoded from binary to decimal, the decoded digit being represented by a ground signal on a corresponding lead to one of the NOR gates 1110 to 1119.

Figure 9:
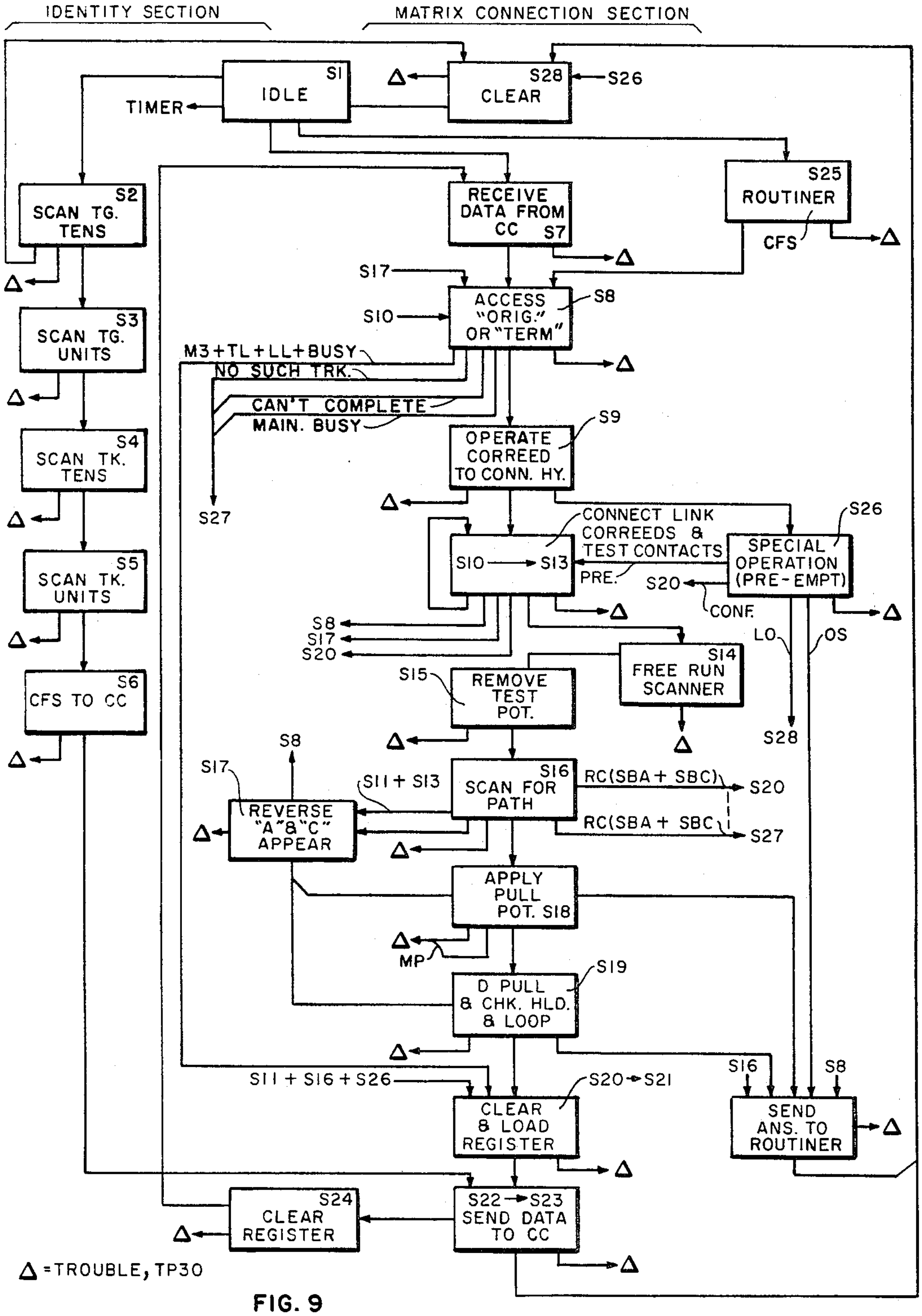
FIG. 9 is a simplified sequence chart for the switch marker.

The operation in conjunction with the call originated at station S00 will now be described in greater detail. The operation is controlled by a wired logic program in the sequence and supervisory circuits 802. A simplified sequence state flow chart of the program is shown in FIG. 9. In the idle state S1 the marker is conditioned to recognize originating calls for service received via the identifier, or common control calls received via the set of conductors DB at the data transfer unit 801.

Upon initiation of the call the signal equipment in unit C00–00 places ground potential on the E conductor, and in response thereto the CFS relay of terminal circuit T00–00 is operated and via contacts of this relay the negative terminal of the 50-volt exchange battery is connected via the 4300-ohm resistor 311 to diode 312, and thence to the identification conductor CM00–00. This potential is applied via diode 721 to conductor TG00, and thence via diode 722 to the input conductor GT0 of the group tens scan circuit 711. Referring to FIG. 11, the potential on conductor DCD1 from the sequence circuit is normally at ground potential, and therefore only those test gates 1100 to 1109 which have negative potential on the input test conductor will have their transistor (FIG. 12) saturated to apply ground potential to the output. The outputs of all of the test gates are inverted at the inputs of gate 1131. Thus a ground potential on the output of any one of the test gates produces a negative potential at the output of gate 1131 to generate a true signal condition on lead MX.

The signal MX along with other conditions advances the sequence to state S2, in which the signal condition on lead DCD1 is at ground potential and the signal on lead SCA becomes true to operate counter A. The output of the counter is supplied via gates 1011 to 1014 and gates 1031 to 1034 to the decode circuit 1140. At scan step 0 the two inputs of NOR gate 1110 are at ground potential so that its output becomes true (negative potential) and enables relay driver 1120. The signal from gate 1110 is also supplied via OR gate 1132 to make the signal on lead TGT true. With the signal on lead TGT true the sequence circuit will respond to inhibit the signal on lead SCA to thereby stop the counter A, so that the scan remains at step 0. The sequence circuit also supplies a signal on lead GPG to operate relay driver 1133 so that ground potential is extended to operate the relay PG0, and thereby connect the ten identification conductors TG00 to TG09 to the inputs of the group units scanner 712. The sequence state is advanced to S3.

The sequence circuit now applies a signal to lead SCB which via gated pulse amplifier 1002 operates the counter B (not shown) and scans in the group unit scanner 712, in the same manner as in the tens scanner. Upon reaching step 0 and detecting the negative potential on lead GU0 a signal is sent to the sequence circuits to inhibit the signal SCB and thereby stop the coutner B, and the output relay RG0 is operated. Once operated the relays PG0 and RG0 lock to the ground via contacts of relay DPC.

According to the invention, the sequence circuit now generates a signal on lead ABP (apply blanking potential) to operate the relay driver 701 and relay 702. Via contacts of relay 702 the blanking potential is connected from the +16-volt source via 100-ohm resistors 731 to 739, the break contacts of relays PG1 to PG9 and diodes in series therewith, and thence to the 90 conductors TG11 to TG99. The normally closed contacts of relay PG0 have been operated to the open condition to prevent the blanking potential via resistor 730 from being applied to lead GT0. The blanking potential via 100-ohm resistor 725 is extended via the break contacts of relays GU1 to GU9 and thence via make contacts of relay PG0 to the nine conductors TG01 to TG09. The break contacts of relay RG0 have been operated to prevent the blanking potential from being applied to lead GU0. Thus all of the group identification conductors have blanking potential thereon except TG00. The blanking potential is extended via the diodes to the terminal circuit identification conductors except those in group 00.

The blanking arrangement is shown more clearly in FIG. 12, wherein nine of the CM identification conductors of the terminal circuits are shown, three from each of the groups 00, 01, and 11. The 4300-ohm resistor 311, contacts of the CFS relay, and the diode 312 which are a portion of the terminal circuit T00–00 have also been shown, along with the corresponding 4300-ohm resistors, call for service contacts, and diodes of the eight terminal circuits associated with the other CM conductors shown in FIG. 12. The conductor CM00–00 is connected via diode 721 to the group identification conductor TG00, and via diode 821 to the trunk identification conductor TK00, and the other eight CM conductors are shown connected via corresponding diodes to their TG and TK conductors.

Thus it may be seen in FIG. 12 that the positive blanking potential applied to all of the group identification conductors except TG00 will appear on all of the terminal circuit identification conductors in the other groups. Thus even though there is a call for service in another group, and the contacts of its CFS relay are operated, the negative potential will be blanked and does not appear on the CM identification conductor, and thus cannot appear on the trunk identification TK conductor. Note that the ten inputs of the trunk scanner 811 and 812 are connected to test gates similar to test gate 1100. At these gates if the input signal is at ground or any positive value or appears as an open circuit, the transistor therein cannot be turned on, if the other input signal is at ground potential. Thus only call signals in the identified group will supply negative potential to the trunk identification TK conductors. This effectively prevents the identifier from identifying the two digits for a group in response to one call for service, and the two digits of an individual trunk in response to another call for service, which would provide an erroneous indication.

Returning to the sequence of operation, identification of the digit in the group unit scanner 712 supplies a signal to the sequence circuit to advance the state to S4. The sequence circuit now applies a signal to lead SCC to supply clock pulses via gated pulse amplifier 1003 to enable the counter C (not shown) in the data transfer unit, which causes the inputs at the trunk tens scanner 811 to be enabled. The negative call potential on lead CM00–00 extends via diode 821 and 822 to lead TT0 at the input of the scanner 811. When the counter C steps to the step 0 the input signal is detected and a signal is transmitted to the sequence circuit to inhibit the signal on lead SCC and to advance the sequence to state S5. The output relay PT0 is also operated and locked at contacts of relay DPC.

The call signal on lead TK00 now extends via contacts or relay PT0 to lead TU0. The counter D (not shown) is enabled via a signal on lead SCD, and the trunk units scanner 812 operates to detect the input signal at step 0 and cause the sequence circuit to inhibit the signal on lead SCD. The relay RT0 is operated and locked via contacts of relay DPC. The four digits of the calling line number are now registered in the originating number flip-flops of the data transfer unit 801. The sequence is advanced to state S6.

In state S6 the sequence circuit 802 supplies a signal via the data transfer unit to one of the set of conductors DB to inform the common control 100 of the call. The common control then selects an idle register-sender junctor, for example the one associated with line J11. The common control then sends a signal via another set of conductors DB to inform the marker to go ahead. The sequence advances to state S22.

The common control accepts the information in the originating digit registers from data transfer unit 801 via the set of conductors DB. The setting of flip-flops in the common control causes the signals to be applied back via the set of conductors DB to the inputs of the originating digit registers in data transfer unit 801. Upon detecting parity between the output and input conductors of these flip-flops the sequence circuit advances the state to S23.

A signal is sent to the common control via another conductor of set DB and the sequence is advanced to state S24.

In state S24 the sequence circuit generates a signal on lead CLEAR to reset the flip-flops of the data transfer 801, and also supply a signal to relay driver 714 to operate relay DPC and release the identification relays in identifier 700. The sequence is advanced to state S7.

It should be noted at this point that there are two ways in which the sequence state S7 may be entered. One is that following identification of a calling line in response to a call for service signal as has been just described, and the other is initiated by the common control when a connection is to be established through the switch matrix. In each situation the subsequent operation is substantially the same. For convenience this operation will be described only once in conjunction with the establishment of the final connection between the calling and called lines. For the originating connection the sequence operation continues, to cause a connection to be established from the calling line terminal circuit T00–00 through the switch matrix to the register junctor receiving terminal T90–11, and the marker is then released. The calling party at station S00 may then proceed to dial or key pulse the call signals over that connection into the register. Also for some calls the common control will subsequently seize the marker and cause a connection to be established from the sender terminal T91–11 to the selected outgoing trunk circuit such as T11–19. Upon completion of sending, the common control will again seize the marker to establish the final connection, and the marker enters state S7.

In state S7 the marker sends a signal via one of the set of conductors DB to the common control to send information, and subsequently the common control returns a signal to tell the marker to accept the information. The sequence circuit then generates a signal on lead RCV to cause the data on the set of conductors DB to be loaded into the registers of the data transfer unit 801. At this point we assume that the common control has seized the marker to complete a connection from calling line terminal circuit T00–00 to the outgoing trunk line terminal circuit T11–19. The originating number 0000 will be received in the sixteen flip-flops ORA1 to ORD8, and the terminating number 1119 will be received in the sixteen flip-flops TMA1 to TMD8. The sequence is advanced to state S8.

The signal DCD1 to the group tens and units scanner 711 and 712 is now at negative potential, and a corresponding signal on lead DCD2 to the trunk tens and units scanners 811 and 812 is also at negative potential so that all of the test gates will have their outputs at ground potential regardless of any signals on the test input leads to these scanners. The terminating number is handled first, and the signal on lead OR–0 is true. This enables the gates 1021 to 1024 from flip-flops TMA1 to TMA8 and the corresponding gates from flip-flops TMB1 to TMD8. The first digit of the terminating number is thus supplied via OR gates 1031 to 1034 to the decode unit 1140, causing a ground potential to be supplied to the decode lead 1, so that NOR gate 1111 having both inputs at ground potential supplies a negative potential at its output to operate relay driver 1121 and via its contacts and contacts of relay driver 1133 operates relay PG1, which locks via contacts of relay DPC. In like manner the other three digits of the terminating number are decoded to operate relays RG1, PT1, and RT9. The signal on lead PTC becomes true to operate the relay drivers 713 and 813, so that negative battery potential is supplied via a resistor, contacts of relay driver 713, contacts of relay PG1, and contacts of relay RG1 to lead PTG11, and then via diode 323 to one side of the winding of the TC relay of terminal circuit T11–19. Ground potential is supplied via contacts of relay driver 813, contacts of relay RT9 and a diode, contacts of relay PT1, to conductor TK19, and thence via diode 822 and lead CM11–19 to the other side of the TC relay to cause it to operate. Next the sequence circuit supplies signals to operate relay drivers 674 and 675 to supply the ground signals AGRD and CGRD. The sequence is then advanced to state S9.

After checking continuity of the necessary connnections to the set of conductors H, the sequence circuit advances the state to S10.

The AX relay in terminal circuit T11–19 is then operated in response to sequence signals to trunk control unit 500 to operate relay driver 503 and supply ground over lead AS which is applied via the operated contacts of the TC relay to the upper winding of the AX relay. Signals operating the relay driver 502 then apply ground via conductor ASL to lock the AX relay via its own contacts and its lower winding through a resistor to the negative exchange battery potential. The TC relay is then dropped by releasing the identifier trees, there being a signal from the sequence circuit to operate the relay DPC to release the identifier scanner output relays. The sequence is then returned to state S8. The second time in state S8 the sequence circuit has the signal on lead OR–1 true and that on lead OR–0 false so that the originating line number in the data register is supplied to the identifier. The first digit is supplied from flip-flops ORA1 via gates 1011 to 1014 and OR gates 1031 to 1034 to the decoder 1140. The decoded digit 0 causes ground potential to be supplied to NOR gate 1110 which operates relay driver 1120 and causes relay PG0 to operate and lock via contacts of relay DPC. In like manner the relays RG0, PT0 and RT0 operate and lock to contacts of relay DPC. This causes the identifier tree to apply a negative signal to lead PTG00 and a ground signal to lead TK00 to operate the TC relay of terminal circuit T00–00. The sequence is then advanced to state S9 and into state S10 a second time.

The second time in state S10 the sequence circuit supplies a signal to operate relay driver 506 to connect the relay PAL to conductor PA, which extends through contacts of the AX relay which is operated in terminal circuit T11–19 to the appearance on the A matrix and thence through the matrix unit A1 to operate the relay ALK1 in the connect and path control circuit 600. The ALK relays have high resistance, so the crosspoint relay does not operate. This connects the C leads of the links on matrix A1 to the scanner gates 601 to 610. The sequence circuit supplies a signal to operate relay driver 654 to operate the relay AT, which connects the negative potential to the link testing resistors. The sequence is then advanced to state S11.

The connection from the AB links to the test gates 601 to 610 is tested using the negative potential applied to the links via the link testing resistors and the make contacts of relay AT. Note that the test gates 601 to 610 are similar to test gate 1100, except that there are two test type inputs at each (—16-volt bias resistor omitted) for the link inputs. Thus each of these gates to provide a true (negative) output signal requires that the counter input be at ground potential and that each of the other inputs be open or ground. The counter 620 is actuated by the signal SC from the sequence circuit and if the signal on lead PATH becomes true at any step of the counter this indicates an open connection between the link and the test gate, and a fault indicating procedure is initiated. If the scan is completed and the signal on lead PATH remains false, the operation proceeds to the next step.

Subsequently the sequence circuit causes the relay driver 504 and the trunk control circuit 500 to operate to connect the PCL relay via its contacts and the lead PC in the set of conductors H via the contacts of the TC relay in terminal circuit T11–19 and lead PC and the operate winding of one crosspoint in the matrix unit C1 to operate relay CLK1 in the connect path control circuits 600. Note that the resistance of the CLK relays is sufficiently high that even though the current flows through the winding of one of the crosspoint relays it is of insufficient value to operate that crosspoint relay. The connection of the BC links to the test gates 601 to 610 is now checked (the AB link inputs being inhibited by gates not shown) by operating the counter 620. In state S14 the counter 610 is free run to provide for a random starting point. In state S15 the signals to relay drivers 674 and 675 is removed to release the relays AT and CT. The sequence is then advanced to state S16.

In state S16 the counter 620 is operated to check for an idle path which will be indicated by coincidence of an open circuit on an AB link, on a corresponding BC link, and a ground signal from the counter. Upon finding such a route the signal on lead PATH becomes true and inhibits gate 692 to stop the counter. The signal on lead PATH is also sent to the sequence circuit and the signal is advanced to state S18. Assume for example that the test gate 601 output is the one which has become true. Then a relay driver in its output circuit applies ground potential to operate relay P1, which locks via contacts of relay DP. This completes a relay tree for pulling the selected path.

In state S18 the sequence circuits supply a signal to relay driver 618 to apply the pull ground. This ground is applied via the contacts of relay P1 and contacts of relay PM1 to the pull conductors of the BC link in the matrix. Next a test is made using a special test potential supplied to the network and the polar relay MP to test for multiple paths. If there are no multiple paths detected, the sequence circuit next operates the relay drivers 505 and 507 to apply negative pull potentials through the terminal circuits on the two sides of the network to operate the selected crosspoints in the three stages. Now the sequence circuit operates relay driver 508 to apply a ground signal via lead COG over the set of conductors H and through contacts of the TC relay of terminal circuit T11–19 to apply ground potential to the lower winding of the CO relay at the C appearance side of the network via lead CC. This potential extends through the hold windings of the three stages to lead CA on the A appearance side and thence through the upper winding of the CO relay of terminal circuit T00–00. If the path has been properly pulled and the CO relays have operated, contacts (not shown) of the CO relay apply a potential in terminal circuit T11–19, which is applied to a conductor extending through contacts of the TC relay to the trunk control circuit 500 as a signal to the sequence circuit. This signal COP causes the sequence to advance to state S19.

State S19 is the final sequence state dealing directly with the matrix connection. The relay drivers 505 and 507 are restored to remove the pull potential. The relay driver 509 has previously been operated to apply ground via lead CNC which in the originating terminal circuit T00–00 extends via make contacts of relay IN to operate CCI, and in the terminating terminal circuit T11–19 extends via break contacts of relay IN to operate the CCO relay. Relay drivers 510 and 511 are operated to apply a path via leads CK1 and CK2 and via contacts of the CCI and CCO relays respectively and the two terminal circuits to check the continuity over the four transmission path leads and the EC lead through the network, and thereby operate the relay LPT.

The sequence then advances through states S20, S21, S22 and S23 to send certain information to the common control via the set of conductors DB and checks parity, and then advances to state S28.

In state S28 various circuits are restored to normal, some circuits are checked for proper open or continuity condition, and the marker is released .

While we have described above the principles of our invention in connection with specific apparatus, it is to be clearly understood that this description is made only by way of example and not as a limitation to the scope of our invention.

What is claimed is:

1. In a communication switching system:
a plurality of terminal circuits,
terminal identification conductors each individual to a terminal circuit,
a set of group conductors each assigned a particular group identity number, and a set of trunk conductors each assigned a particularly trunk identity number,
two isolating rectifiers (e.g. 721 and 821) individual to each terminal identification conductor (e.g. CM00–00) over respective ones of which the conductor is coupled to one group conductor (e.g. TG00) and one trunk conductor (e.g. TK00) in accordance with the number (e.g. 00–00) assigned to the corresponding terminal circuit,
means responsive to a call request appearing at a terminal circuit to apply a first potential to the corresponding terminal identification conductor, the potential being extended via said two rectifiers in their forward direction from the input conductor to the corresponding group conductor and trunk conductor, it being possible that a plurality of said terminal identification conductors be so marked with said first potential simultaneously,
group number recording means and an arrangement coupling it to said group conductors, means to cause said group recording means to select and record the number of only one group conductor on which said first potential appears,
means responsive to said recording of a group identity number to apply a second potential to all of said group conductors except the one corresponding to the number recorded in the group number recording means, the second potential being extended via said rectifiers to all of said terminal identification conductors except those coupled to said identified group conductor, to thereby blank the first potential in all but the selected group,
trunk number recording means and an arrangement coupling it to said trunk conductors, means to cause said trunk number recording means to select and record the number of only one trunk conductor on which said first potential appears,
whereby the group and trunk numbers corresponding to one call request are recorded.

2. In a communication switching system, the combination as claimed in claim 1, wherein each of said terminal circuits includes connect switching means, and wherein there is further included means effective responsive to the completion of said recording in said trunk number recording means to actuate the connect switching means in the terminal circuit corresponding to the number recorded in said group and trunk number recording means.

3. In a communication switching system, the combination as claimed in claim 2, wherein there is included a switching network controlled by a marker for establishing connections between any two of said terminal circuits, and wherein means is included to supply a signal via the actuated connected switching means of a terminal circuit, and thence via the switching network to the marker for path selection control.

4. In a communication switching system, the combination as claimed in claim 3, wherein each of said terminal circuits further includes auxiliary connect switching means, and wherein there is included means to actuate said auxiliary connect switching means via the actuated connect switching means, means to release the connect switching means while holding locked the auxiliary connect switching means in one terminal circuit, means to record the identity of another terminal circuit in the group and trunk number recording means, and means to actuate the connect switching means of said other terminal circuit in accordance with the recorded number, means to supply a signal via the actuated auxiliary connect switching means, and thence via one side of the network to the marker, and to supply a signal via the connect switching means and thence via the other side of the network to the marker for selecting and establishing a path through the network between said two terminal circuits.

5. In a communication switching system, the combination as claimed in claim 1, wherein said group number recording means and said trunk number recording means each comprises means for recording two digits, with input connections to the second digit recording means of each controlled in accordance with the first digit recorded in each.

6. In a communication switching system, the combination as claimed in claim 1, wherein said group number recording means includes a plurality of output relays selectively operated in accordance with the number recorded wherein said second potential is suppiled to said group conductors via normally closed contacts of said output relays, so that operation of the output relays in accordance with the given group number prevents connection of the second potential to the corresponding group conductor.

7. In a communication switching system:
a plurality of terminal circuits;
a plurality of terminal identification conductors individual to terminal circuits;
a set of group identification conductors each assigned a particular group identity number, and a set of trunk identification conductors each assigned a particular trunk identity number;

each terminal identification conductor having one diode connected between it and one of the group identification conductors and another diode connected between it and one of the trunk identification conductors, the first polarity poles of both diodes being connected to the terminal identification conductor;

a group register and an arrangement for coupling it to said group identification conductors;

a trunk register and an arrangement for coupling it to said trunk identification conductors;

means in each of said terminal circuits responsive to a call request thereat to connect its terminal identification conductor via a resistor to a source of potential of a first polarity with respect to a reference point, the potential being thereby extended via said diodes to the corresponding group identification conductor and trunk identification conductor, it being possible that a plurality of said terminal identification conductors be connected via their respective resistors to the source of potential of the first polarity simultaneously;

means to select and record in said group register the identity of only one group identification conductor at a time on which said first polarity potential appears;

means responsive to said recording of a group identity to connect all except the identified one of the group identification conductors to a source of potential of a second polarity with repsect to said reference point to thereby blank any first polarity potential appearing on all of the terminal identification conductors except those connected via a diode to the identified group identification conductor whose number is recorded in the group register;

means effective subsequent to said connection of the second polarity blanking potential to select and record in said trunk register the identity of only one trunk identification conductor on which said first polarity potential appears;

whereby the group and trunk numbers of only one terminal circuit at which a call request appears is recorded in said registers.

8. In a communication switching system, the combination as claimed in claim 7, wherein said group register comprises a first section for recording a first group identity digit and a second section for recording a second group identity digit, a plurality of output relays connected to the first section, each corresponding to a particular first group digit value, and a plurality of output relays connected to the second section each corresponding to a particular second group digit value, each section having a plurality of input conductors corresponding respectively to the output relays, each group identification conductor having a diode connected between it and one of the first section input conductors with the first polarity pole of the diode connected to the group identification conductor, and each group identification conductor being also connected via a normally open set of contacts of one of the first section output relays to one of the second section input conductors;

a connection from each input conductor of each section via a normally cloosed set of contacts of the corresponding output relay and an apply-blanking-potential switching device to said source of potential of the second polarity;

wherein said means to select and record the number of one group conductor on which said first potential appears comprises means to enable said first section to select one of its input conductors having the first potential thereon and operate the corresponding output relay, and means to enable the second section to select one of its input conductors connected via actuated contacts of said first section relay and having said first potential thereon and to operate the corresponding output relay;

and wherein said means to apply said second potential comprises means to actuate said apply-blanking-potential switching device to thereby apply the second potential to all of the said section input conductors except the one at the first section and the one at the second section whose output relays are operated.

9. In a communication switching system, the combination as claimed in claim 8, wherein said trunk register comprises two sections, a first section for recording a first digit and a second section for recording a second digit of the numbers assigned to the trunk identification conductors, each section having a plurality of input conductors and a plurality of corresponding output relays, each trunk identification conductor having a diode connecting it to one of the conductors of the first section of the trunk register, and each trunk identification conductor being connected via a normally open set of contacts of one of the output relays of the first section to one of the input conductors of the second section of the trunk register;

each of the input conductors of each section of each register being connected to a detector arranged to detect the presence of a potential of the first polarity with respect to said reference point;

and wherein said means to select and record in said trunk register the identity of only one trunk identification conductor comprises means to select only one input conductor at the first section having said first potential thereon and to operate the corresponding ouput relay, and means to select only one input conductor at the second section connected via actuated contacts of the operated relay of the first section to a trunk identification conductor and having the potential of the first polarity thereon and to operate the corresponding output relay.

10. In a communication switching system, the combination as claimed in claim 9, wherein each of said terminal circuits includes a terminal connect relay, and wherein the combination further includes means to operate the terminal connect relay of a terminal circuit whose identity is recorded in the group and trunk registers, said operate path including contacts of the operated output relay of each section of each register.

11. In a communication switching system, the combination as claimed in claim 10, wherein at said second section of one of said registers the input conductors of the section are connected to normally open operate path contacts of the corresponding respective output relays of the same section;

wherein said terminal connect relay of each terminal circuit has a winding with one side connected to the corresponding terminal identification conductor and the other side of the winding connected to another conductor common to a plurality of terminal circuits;

and wherein said operate path extends via said operate path contacts via the identification path to the winding of the terminal connect relay and thence via said other conductor and via contacts of the operated ones of the output relays of the two sections of the other register, and means to supply operating current over said operate path in the forward direction of the diodes in the identification path.

12. In a communication switching system, the combination as claimed in claim 10, further including a switching network for connecting any two of said terminal circuits, said network including an end stage comprising a plurality of matrix units, each matrix unit comprising a coordinate array of crosspoint relays having some of said terminal circuits connected to one side thereof and interstage links connected to the other side;

a marker including path selection apparatus, a plurality of link connect relays individual to said matrix units of said end stage, each connected to an operate conductor of one link of the corresponding matrix unit, there being a plurality of crosspoint relays having their operate windings connected in common to said link operate conductor, and the other side of the windings being connected individually to the corresponding terminal circuits of that matrix unit;

means to complete an operate path via contacts of the operated terminal connect relay through the winding of a crosspoint relay to the link connect relay for the corresponding matrix unit to operate the link connect relay while the crosspoint relay remains unoperated;

a given conductor of each of the interstage links connected to that matrix unit being connected through respective contact sets of the link connect relay to the path selection apparatus;

means to actuate the path selection apparatus to select a path including one of the interstage links corresponding to the operated link connect relay, and means to establish a connection from said terminal circuit via said selected path.

13. In a communication switching system, the combination as claimed in claim 10, wherein each of said terminal circuits further includes an auxiliary connect relay, means to complete an operate path for the auxiliary connect relay via contacts of the operated connect relay of the terminal circuit, means to lock the auxiliary relay via a path including a set of its own contacts, means to clear said group and trunk registers and release the terminal connect relay of the first selected terminal circuit, means to record the identity of a second terminal circuit in the group and trunk registers and to thereby operate the terminal connect relay of that terminal circuit, so that in the first selected terminal circuit the auxiliary connect relay is operated and in the second selected terminal circuit the terminal connect relay is operated.

14. In a communication switching system, the combination as claimed in claim 13, further including a switching network including a first and a last stage, each of said stages comprising a plurality of matrix units, each matrix unit comprising a plurality of crosspoint relays, each matrix unit having connections on one side to some of said terminal circuits and on the other side to interstage links;

a marker including path selection apparatus, link connect relays individual to the matrix units of the first stage, and other link connect relays individual to the matrix units of the last stage, each link connect relay being connected via windings of crosspoint relays in the corresponding matrix unit to the terminal circuits connected to that matrix unit;

each matrix unit having two network appearances one to said first stage and one to said last stage;

means to complete a path extending via contacts of the operated auxiliary connect relay in said first terminal circuit and via a crosspoint winding on one side of the network to operate the corresponding link connect relay, and means to extend an operate path via the operated terminal connect relay in said second terminal circuit via a crosspoint relay winding on the other side of the network to operate the corresponding link connect relay, the current for operation of the link connect relays being insufficient to operate the crosspoint relays in series therewith;

each link connect relay having a plurality of sets of contacts to connect a given conductor of the interstage links connected to the associated matrix unit to the path selection apparatus;

means to actuate the path selection apparatus to select a path through the network between the first and second terminal circuits having the corresponding interstage links of the respective matrix units at the two sides of the network idle, and means to establish the connection via the selected path, the operate path including contacts of the auxiliary connect relay of said first terminal circuit and contacts of the terminal connect relay of said second terminal circuit.

15. A line identification arrangement comprising a plurality of terminals and terminal identification conductors individually associated therewith, a set of group identification conductors and a set of trunk identification conductors, two isolating diodes individual to each terminal identification conductor connecting it respectively to one group identification conductor and one trunk identification conductor, a group register and an arrangement for coupling it to said group identification conductors, a trunk register and an arrangement for coupling it to said trunk identification conductors, means in each terminal circuit responsive to a call request thereat to connect a call potential to its corresponding terminal identification conductor, means to select and record in said group register the identity of only one group identification conductor to which said call potential has been extended, means responsive to said recording of the identity of the group identification conductor to connect all except the identified one of the group identification conductors to a second source of potential to thereby blank the call potentials on all terminal identification conductors except those connected to the identified group identification conductor, means to select and record the identity of only one trunk identification conductor to which said call potential has been extended, whereby the group and trunk numbers of only one terminal at which a call request appears is recorded in the registers.

References Cited

UNITED STATES PATENTS

| | | | |
|---|---|---|---|
| 3,133,157 | 5/1964 | Platt et al. | 179—18.2 |
| 3,280,268 | 10/1966 | Drake et al. | 179—18.61 |
| 3,328,534 | 6/1967 | Murphy et al. | 179—18.21 |

KATHLEEN H. CLAFFY, *Primary Examiner.*

LAURENCE A. WRIGHT, *Assistant Examiner.*